April 14, 1953  W. B. BARNUM  2,634,870
LOADING CONVEYER
Filed Oct. 15, 1951  2 SHEETS—SHEET 1
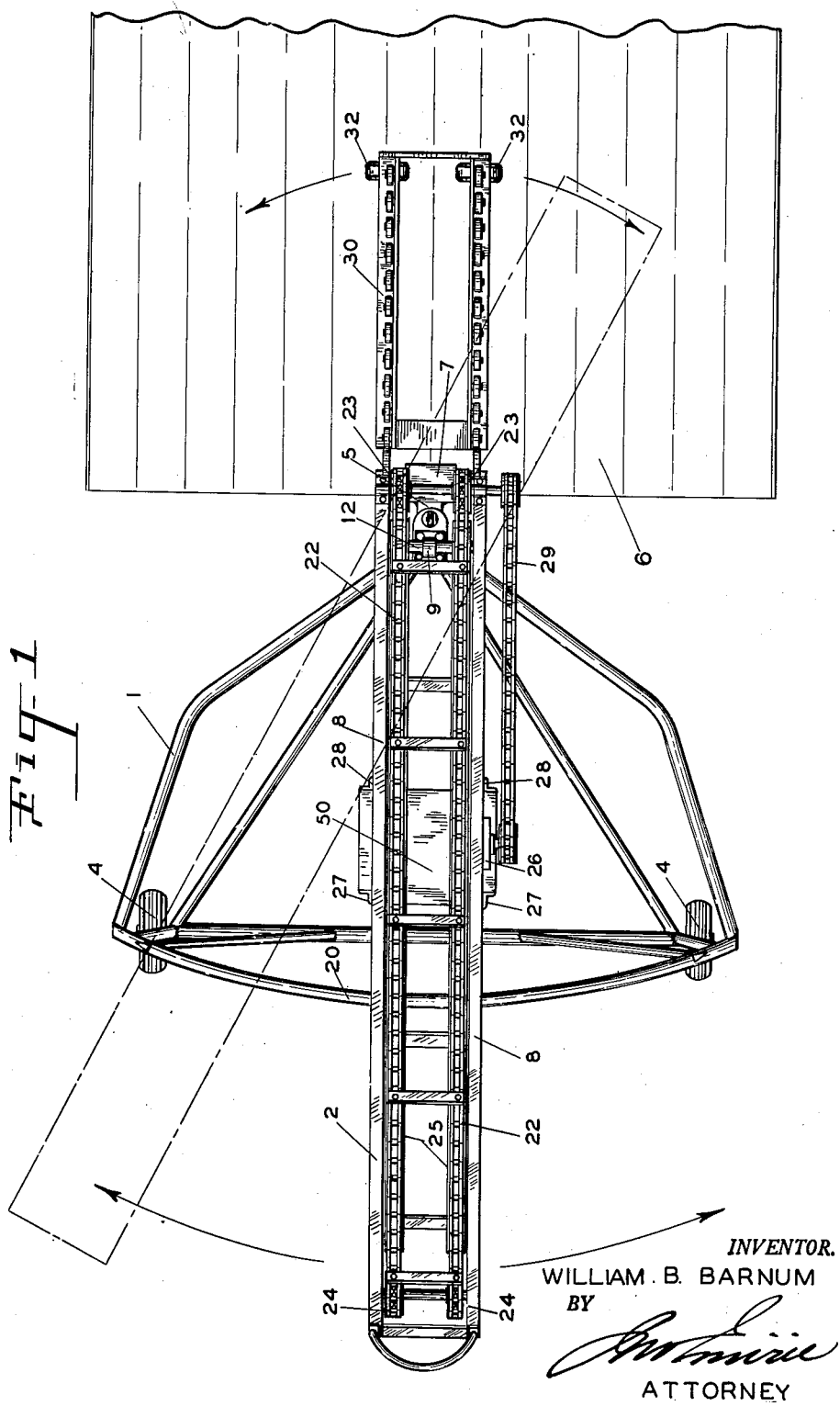
INVENTOR.
WILLIAM B. BARNUM
BY
ATTORNEY

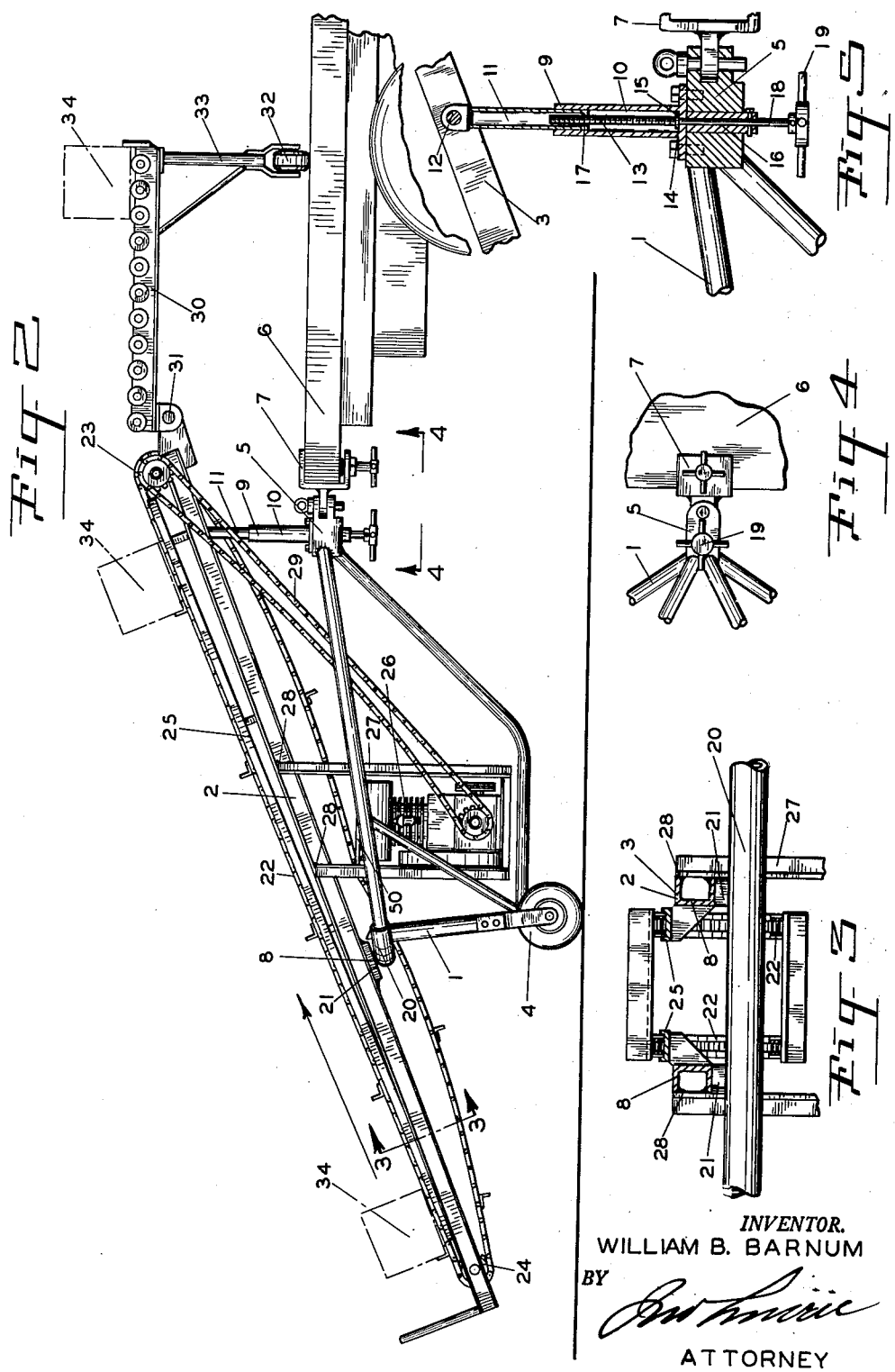

Patented Apr. 14, 1953

2,634,870

UNITED STATES PATENT OFFICE 2,634,870

LOADING CONVEYER

William B. Barnum, Medford, Oreg.

Application October 15, 1951, Serial No. 251,345

5 Claims. (Cl. 214—38)

This invention relates to conveyors and is particularly adapted for the loading of boxes containing fruit and the like onto trucks.

The primary object of this invention is to mount a power driven conveyor upon a trailer to be connected to the rear end of a truck. The conveyor is capable of operation at various angles to the bed of the truck, as for instance the picking up of boxes of fruit from either side of the roadway at the rear of the trucks.

This is accomplished by mounting an inclined power driven conveyor on a two-wheeled trailer. The upper end of the conveyor is pivotally mounted to the forward end of the trailer frame. The lower end of the conveyor rests on a horizontal track forming part of the trailer permitting the lower end of the conveyor to be moved from side to side of the trailer, depending upon which side of the rear of the truck the boxes are to be loaded from.

These and other incidental objects will be apparent in the drawings, specification and claims.

Referring to the drawings:

Figure 1 is a plan view of my new and improved loading conveyor, showing the same connected to the rear of the bed of a truck, only a portion of the bed being shown.

Figure 2 is a side elevation of Figure 1.

Figure 3 is a sectional view, taken on line 3—3 of Figure 2, looking in the direction indicated, illustrating the frame of the conveyor resting on the supporting horizontal track of the conveyor.

Figure 4 is an inverted plan view, illustrating how the trailer is hitched to the truck bed.

Figure 5 is an enlarged detail sectional view of the forward adjustable pedestal for supporting the upper end of the conveyor.

Referring more specifically to the drawings:

My new and improved loading conveyor consists of a trailer 1, having an inclined conveyor 2 mounted thereon. The trailer consists of a frame 3 mounted upon pneumatic wheels 4 at its rear end, and having its forward end or tongue 5 pivotally connected to the rear of the truck bed 6 by way of the special removable clamp 7. By using this type of clamp, the loader can be trailed from either the center of the truck or from either side, depending upon the work to be performed.

The conveyor consists of parallel frames 8. The forward and upper ends of these frames are mounted to the pedestal 9. The pedestal 9 consists of a tubular base 10, which is rigidly fixed to the tongue 5 by any suitable means. A post 11 is pivotally connected at its upper end to the upper end of the frames 3 by way of the cross shaft or bar 12, its lower end working within the tubular base 10, as best illustrated in Figure 5. The vertical position of the supporting post 11 is determined by the threaded screw 13, which is journalled at 14 within the base 10, the position of the same being determined by the shoulder 15 and the collar 16.

The screw 13 is threaded into the lower end of the supporting post 11 at 17. The lower end of said screw, which extends down at 18, has a handle bar 19 thereon for rotating the same in adjusting the height of the upper end of the conveyor 2. The lower end of the conveyor is supported on the cross frame or rail 20, as best illustrated in Figures 1, 2 and 3.

Wearing pads 21 ride on the rail and form part of the parallel frames 3 of the conveyor 2. A conventional conveyor chain 22 is trained about the driving sprockets 23 and the idlers 24. The side chains ride on rails 25.

A power plant 26 is mounted within the carrying frame 27, which is fixedly secured to the parallel side rails at 28 to the conveyor. This power plant drives the conveyor chain 22 by way of the driving chain 29.

A horizontal roller conveyor 30 is pivotally connected to the conveyor 2 at 31 at its one end, and supported by the wheels 32 by way of the post 33 at its opposite end. The object of being able to adjust the height of the upper end of the conveyor to various heights by the adjusting screw 13 by way of the hand wheel 19 is to maintain the roller conveyor 30 in a level condition at all times, not only when the truck and trailer are on a level surface, but when the truck and trailer are being hauled up or down hill. I have provided a plate or shoe 50 over which the conveyor chain 22 rides on its lower run so that clearance will be provided for running over the motor 26. Since the conveyor chain 22 is travelling downward the slack in the chain permits the chain to slide over the shoe 50. The cross bars or other similar pusher elements are of such a size that they will not bind the chain on the shoe 50 but will tend to raise the chain at its point of contact and further aid the chain in clearing the shoe 50.

I will now describe the operation of my new and improved loader. The lower end of the conveyor 2 is swung to the desired angle in regards to the roadway and the truck bed 6 and the trailer 1 by pivoting the same about the pedestal 9 and moving the lower end of said conveyor across over the rail 20, as indicated by full and broken line positions in Figure 1.

The boxes of fruit are indicated by the broken lines 34 in Figure 2. They are loaded on the lower end of the conveyor from where they are delivered on to the horizontal conveyor 30, from where they are removed and stacked on the truck.

In the loading of fruit, boxes may be located on either side of the row through the field, therefore by simply swinging the conveyor as above described to either side of the truck or roadway, the boxes can be easily loaded thereon.

What I claim is:

1. A loading conveyor comprising a mobile frame, means for removably connecting said frame to a transport vehicle, a conveyor support pivotally mounted on said frame for lateral movement and disposed at an incline with its leading end uppermost and disposed above said means, an endless conveyor mounted on said support, drive means for said conveyor carried by said support, a second conveyor pivotally mounted at one end to the upper end of said support, and a mobile mount on the free end of said second conveyor for mounting on the vehicle.

2. A loading conveyor as defined in claim 1 wherein said removable connecting means is pivotally connected to said frame.

3. A loading conveyor as defined in claim 2 wherein said conveyor support is pivotally mounted on said frame at its upper leading end and the lower trailing end of said support rides freely on an arcuate cross member of said frame.

4. A loading conveyor as defined in claim 3 wherein said conveyor support is universally mounted at its upper leading end and the universal mounting is adjustable as to height relative to said frame.

5. A loading conveyor as defined in claim 4 wherein said second conveyor comprises a roller conveyor.

WILLIAM B. BARNUM.

References Cited in the file of this patent

UNITED STATES PATENTS

| Number | Name | Date |
|---|---|---|
| 806,804 | Hamilton | Dec. 12, 1905 |
| 2,250,933 | Manierre | July 29, 1941 |